United States Patent [19]
Ostromoukhov

[11] Patent Number: 5,438,431
[45] Date of Patent: Aug. 1, 1995

[54] METHOD AND APPARATUS FOR GENERATING DIGITAL HALFTONE IMAGES USING A ROTATED DISPERSED DITHER MATRIX

[76] Inventor: Victor B. Ostromoukhov, Rte du Pavement 10, CH-1018 Lausanne, Switzerland

[21] Appl. No.: 63,984

[22] Filed: May 20, 1993

[30] Foreign Application Priority Data

May 21, 1992 [CH] Switzerland ............... 01633920

[51] Int. Cl.$^6$ ............................................. H04N 1/40
[52] U.S. Cl. ................................ 358/457; 358/456; 358/447; 358/444; 382/296
[58] Field of Search ............. 358/457, 456, 466, 465, 358/447, 444; 382/48, 46, 44, 50

[56] References Cited

U.S. PATENT DOCUMENTS 4,977,464 12/1990 Ikuta ....................... 358/457
5,166,809 11/1992 Surbrook ..................... 358/457

Primary Examiner—Edward L. Coles, Sr.
Assistant Examiner—Fan Lee
Attorney, Agent, or Firm—Page Lohr

[57] ABSTRACT

Method and apparatus enabling color or black/white bi-level or multi-level halftone images to be displayed or printed on various raster output devices, in particular on display devices (cathode ray tubes, plasma displays, liquid crystal displays) or on printing devices (printers, telefaxes). The originality of the present invention is found in the dither matrix $R^{c*n}$ which is obtained by applying on a c-fold replication of a well-dispersed threshold matrix $D^n$ a one-to-one discrete rotation of Pythagorean angle $\alpha = \arctan(b/a)$ or $\beta = \arctan(a/b)$ around an arbitrary point, where $\{a,b,c\}$ are Pythagorean triplets satisfying Diophantine equation $a^2 + b^2 = c^2$ and n is an integer. The images produced using the disclosed method are visually pleasing due to the absence of visible artifacts and to the small typical structure size. In addition, this method offers very smooth intensity gradations throughout the dynamic range.

The disclosed method can be applied to different one-to-one discrete rotations of a c-fold replication of a well-dispersed threshold matrix $D^n$ but it has proved especially effective in the case where a 5-fold replication of well-dispersed threshold matrix $D^n$ is rotated by angle $\alpha = \arctan(\frac{3}{4})$ or $\beta = \arctan(4/3)$. The most interesting cases are those where n=8, 16, and where the dither matrices can faithfully reproduce respectively 65 and 257 distinct intensity levels.

3 Claims, 7 Drawing Sheets

METHOD AND APPARATUS FOR GENERATING DIGITAL HALFTONE IMAGES USING A ROTATED DISPERSED DITHER MATRIX

BACKGROUND OF THE INVENTION

1. Field of the Invention

The present invention relates generally to the synthesis of digital halftone images and relates specifically to a method and to an apparatus enabling color or black/-white bi-level or multi-level halftone images to be displayed or printed on various raster output devices, in particular on display devices (cathode ray tubes, plasma displays, liquid crystal displays) or on printing devices (printers, telefaxes).

The method used to display color images can be reduced to a case of black/white image display if the color image is considered to be separated into three independent color planes (red-green-blue or cyan-magenta-yellow) or into four independent color planes (cyan-magenta-yellow-black), each independent color plane being treated as a single halftone black/white image. Therefore, the present description mainly refers to halftone black/white images, the color extension being implied.

2. Description of the Prior Art

In the printing industry, one of the common methods for reproducing halftone images using bilevel printing devices is the ordered dither method. This method consists in subdividing the whole output image space into repetitive adjoining rectangular areas-screen elements. The inside of each screen element is gradually blackened according to the gray level of the original image, thus ensuring the presence of various gray levels in the reproduction. According to the method used to fill in the screen elements, it is possible to distinguish two main families of dithering methods: a) dispersed-dot ordered dithering. and b) clustered-dot ordered dithering.

Dispersed-dot dithering was introduced by Bayer in 1973. Judice, Jarvis and Ninke proposed a simple recurrent method to compute a well-dispersed dither matrix. In the case of dispersed-dot dithering, the black dots are distributed within each dither element so as to ensure maximal dispersion. This method produces relatively good results when dealing with fine details (for instance, small objects, letters). Moreover, the number of distinct intensity levels which can be obtained using this method is not limited since the screen elements can be as large as necessary. However, a visually disturbing horizontal and vertical ruling may appear on the image produced using the dispersed-dot method. FIG. 2 shows the result of dispersed-dot dithering halftoning with its inherent artifacts. FIG. 4 shows 256 different patterns corresponding to the 256 distinct intensity levels which are reproduced using conventional dispersed-dot ordered dithering of size 16×16. A strong visually disturbing structure is noticeable at several intensity levels. Another big disadvantage of dispersed-dot ordered dithering is its very non-linear reproduction function which is clearly visible on the vertical gray ramp in FIG. 2.

In the case of clustered-dot dithering, which is the method most commonly used for high and medium resolution devices ($\geq 200$ dpi), the black dots are clustered in the middle of each screen element, thus forming round figures. The images produced using this method are quite faithful to the original and are visually pleasing. However, in the case of a medium resolution device (200-600 dpi), the number of distinct gray levels which can be obtained using this method is greatly restricted, due to the discrete nature of the grids. FIG. 1 shows the result of clustered-dot ordered dithering halftoning. A clear banding phenomenon is visible on a vertical gray ramp; small details are poorly rendered. FIG. 3 shows 33 different patterns corresponding to the 33 distinct gray levels produced with conventional clustered-dot ordered dithering, when elementary screen element area equals 32 pixels. This halftone pattern is currently used in 300 dpi printing devices. Holladay has developed a method for defining dither matrices for clustered-dot dither (U.S. Pat. Nos. 4,149,149 and 4,185,304). This approach is limited to "rational tangent screening", that is to the screening technique where the orientation of screen cells is defined by a ratio of integer vertical and horizontal displacements between cells. An improvement of rational tangent screening can be obtained by making use of "supercell" techniques. Schiller (European Patent Nos 0,427,380 A2 and 0.498,106 A2) and Schiller and Knuth (European Patent No. 0.499,738 A2) proposed several implementations which make use of multi-cell threshold arrays. Other methods of using multiple threshold matrices to generate halftone images, were proposed by Kawamura (U.S. Pat. No. 4,752,822) and by Troxel (U.S. Pat. No. 5,124,803). In general, in "supercell" techniques, all elementary screens cells which form a supercell have identical form, but threshold values of corresponding elements vary from one cell to another.

The invented process which is described in the present disclosure is an improvement of the dispersed-dot dithering. Using the disclosed method, we obtain a method where the black dots are clustered inside the figures in the shape of rings and diagonally oriented crosses (see FIGS. 5 and 6). Thus, the invented process offers the advantages of dispersed-dot dithering while minimizing its disadvantages. The invented process has turned out to be particularly effective for 300 and 400 dpi ink-jet printers as well as for 300, 400, 600 and 800 dpi laser printers.

The invented method differs considerably from the "supercell" technique. A rotating threshold matrix obtained using the disclosed method contains smaller sub-matrices which, after rotation, vary in arrangement from sub-matrix to sub-matrix. Nevertheless, the set of threshold values remains the same for all sub-matrices which form the rotating threshold matrix.

BRIEF DESCRIPTION OF THE DRAWINGS

The characteristics and the advantages of the invention will be stated in the following description referring to the enclosed drawings and in which.

DESCRIPTION OF THE INVENTION

The invented process and apparatus are based on the ordered dithering technique, a technique which is well-known to everyone skilled in the art. Let us for clarity's sake recall the principles of the method.

Let $(x_{in}, y_{in})$ be the coordinates of each elementary dot of of the original image, and $g(x_{in}, y_{in})$ the intensity level associated with said dot. Let us assume that intensity level 0 corresponds to white and intensity level 255 corresponds to black. We suppose that the set of coordinates $\{x_{in}, y_{in}\}$ of the original image is related to the set of coordinates $\{x_{out}, y_{out}\}$ of the image produced by a known linear transformation f; the inverse transformation $f^{-1}$ is also known:

$$(x_{out}, y_{out}) = f(x_{in}, y_{in})$$
$$(x_{in}, y_{in}) = f^{-1}(x_{out}, y_{out})$$

Reproducing therefore means going through the set of coordinates $\{x_{out}, y_{out}\}$ of the output image, and for each dot $(x_{out}, y_{out})$ carrying out the following operations:

lookup threshold value $s(x_{out}, y_{out})$ using as a basis the dither matrix associated with the algorithm;

find coordinates $(x_{in}, y_{in})$ of the original image corresponding to dot $(x_{out}, y_{out})$ using the known function $f^{-1}$: $(x_{in}, y_{in}) = f^{-1}(x_{out}, y_{out})$.

compare $g(x_{in}, y_{in})$ to $s(x_{out}, y_{out})$.

If $g(x_{in}, y_{in}) > s(x_{out}, y_{out})$, then dot $(x_{out}, y_{out})$ is black (on a white background). Otherwise, dot $(x_{out}, y_{out})$ is white (background color).

The case of multiple intensity level (multi-level) output devices, well-known to those skilled in the art, can be seen as an extension of the standard bi-level case. Let us suppose that the p-level output device is able to reproduce p different intensity levels in the range $[0 \ldots p-1]$. Between any intermediate intensity levels i and i+1 within the range $[0 \ldots p-1]$, one can apply the standard ordered dither method using a square threshold matrix of size n*n, where n is a member of the set $2^i$ and where i is a positive integer. The number of distinct intensity levels produced with the standard ordered dither method between intensity levels i and i+1, is $n^2+1$. The total number of available intensity levels in the whole range of intensity levels $[0 \ldots p-1]$, when the standard ordered dither method is applied between all intermediate levels, is $n^2*(p-1)+1$ A well-dispersed dither (threshold) matrix $D^2$ of order 2 is defined as follows:

$$D^2 = \begin{pmatrix} 0 & 2 \\ 3 & 1 \end{pmatrix}$$

There is an easy way of finding a $D^{2n}$ matrix starting from $D^n$:

$$D^{2n} = \begin{pmatrix} 4D^n + D_{00}^2 U^n & 4D^n + D_{01}^2 U^n \\ 4D^n + D_{10}^2 U^n & 4D^n + D_{11}^2 U^n \end{pmatrix}$$

where $U^n$ is a singular matrix of size n*n:

$$U^n = \begin{pmatrix} 1 & 1 & \ldots & 1 \\ 1 & 1 & \ldots & 1 \\ \cdot & \cdot & & \cdot \\ \cdot & \cdot & \ldots & \cdot \\ \cdot & \cdot & & \cdot \\ 1 & 1 & \ldots & 1 \end{pmatrix}$$

Figures 7A, 7B:
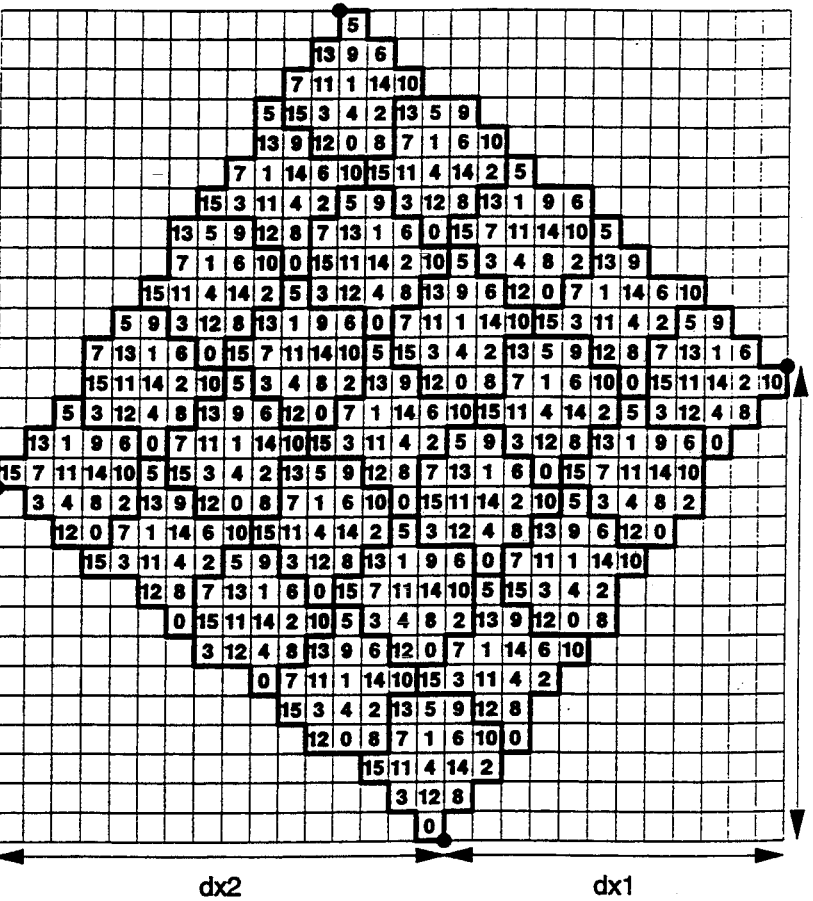
FIG. 7 compares the disclosed rotated 20×20 dither matrix $R^{20}$ (b) to the plain (unrotated) 20×20 well-dispersed dither matrix which is a fivefold replication of the plain 4×4 well-dispersed dither matrix (a).

An example of $D^4$ matrix is given in FIG. 7a.

The originality of the present invention is found in generating the dither matrix $R^{c*n}$ which is obtained by applying on a c-fold replication of a well-dispersed threshold matrix $D^n$ a one-to-one discrete rotation of Pythagorean angle $\alpha = \arctan(b/a)$ or $\beta = \arctan(a/b)$ around an arbitrary point, where $\{a,b,c\}$ are Pythagorean triplets satisfying Diophantine equation $a^2 + b^2 = c^2$ and n is an integer.

The notion of one-to-one discrete rotation is known to scientists and engineers who deal with discrete mathematics. A discrete transformation t is called a one-to-one discrete rotation $R_D(u, \alpha, u_0, v_0)$ of angle $\alpha$ around point $u_0$ with the center of rotation located in the destination space at point $v_0$, if for any discrete point $u \in \mathbb{Z}$ and for a given tolerance $\epsilon$ one can associate, by a one-to-one relationship, a point $v = R_D(u, \alpha, u_0, v_0) \in \mathbb{Z}$ such that $$||v - v'|| \leq \epsilon \qquad (1)$$

where $v'$ is a point obtained by applying an exact rotation $R(u, \alpha, u_0, v_0)$ of angle $\alpha$ around point $u_0$:

$$v'_x = (u_x - u_{0x}) \cos \alpha - (u_y - u_{0y}) \sin \alpha + v_{0x} \qquad (2)$$

$$v'_y = (u_x - u_{0x}) \sin \alpha + (u_y - u_{0y}) \cos \alpha + v_{0y}$$

For any Pythagorean angle $\alpha = \arctan(b/a)$, where a and b are Pythagorean numbers satisfying Diophantine equation $a^2 + b^2 = c^2$, the one-to-one discrete rotation is possible. Moreover, in the case where $$c = a + 1; a > b \qquad (3)$$

the tolerance $\epsilon$ is not greater than 0.5, and the one-to-one discrete rotation $R_D(u, \alpha, u_0, v_0)$ can be derived from the exact rotation R according to (2), by simple rounding:

$$v_x = \text{round}((u_x - u_{0x})\cos\alpha - (u_y - u_{0y})\sin\alpha) + v_{0x} \quad (4)$$

$$v_y = \text{round}((u_x - u_{0x})\sin\alpha + (u_y - u_{0y})\cos\alpha) + v_{0y}$$

Let us consider the general case where we obtain the rotated matrix $R^{c*n}$ from the c-fold replication of a well-dispersed threshold matrix $D^n$ by a one-to-one discrete rotation. First, the well-dispersed threshold matrix $D^n$ is replicated c times vertically and horizontally. Then, the resulting matrix $D^{c*n}$ is rotated by a one-to-one discrete rotation of Pythagorean angle $\alpha = \arctan(b/a)$ or $\beta = \arctan(a/b)$. The triplets $\{a,b,c\}$ are supposed to be Pythagorean, and n to be integer. Two one-to-one discrete rotations of Pythagorean angle $\alpha = \arctan(b/a)$ and $\beta = \arctan(a/b)$ are mirror-symmetrical one to another with respect to the main diagonal of the first quadrant of the Cartesian plan. Therefore, the present description mainly refers to the former rotation, the case of the latter rotation being implied.

Indices (i,j) of the matrix $D^{c*n}[i,j]$ can be considered to be the "coordinates" in the threshold matrix space (in the $\mathbb{Z}$ space where the threshold values are stored). The indices of the squares of the rotated matrix $R^{c*n}[x,y]$ can be calculated using the following formulae:

$$x = \text{round}\left(\frac{dx_1 * (i - i_0) + dx_2 * (j - j_0)}{c\sqrt{(dx_1 * dy_2 - dx_2 * dy_1)}}\right) + x_0 \quad (5)$$

$$y = \text{round}\left(\frac{dy_1 * (i - i_0) + dy_2 * (j - j_0)}{c\sqrt{(dx_1 * dy_2 - dx_2 * dy_1)}}\right) + y_0$$

where $dx_1 = a*n$, $dy_1 = b*n$, $dx_2 = -b*n$ and $dy_2 = a*n$ are the rotation coefficients (see FIG. 7b); $i_0$, $j_0$, $x_0$ and $y_0$ define the positions of the matrices $D^n$ and $R^{c*n}$ in the coordinate systems (i,j), and (x,y) and where shift values $x_0$ and $y_0$ are integers.

The rotated matrix $R^{c*n}$ obtained from the c-fold replication of the well-dispersed threshold matrix by a one-to-one discrete rotation is calculated using the following formula:

$$R^{c*n}[x-x_0, y-y_0] = D^{c*n}[(i-i_0)\bmod(c*n), (j-j_0)\bmod(c*n)]$$

or, simplifying $$R^{c*n}[x-x_0, y-y_0] = D^n[(i-i_0)\bmod n, (j-j_0)\bmod n] \quad (6)$$

where "rotated coordinates" x and y are calculated, for any given i and j, according to (5).

Applying the disclosed method to a regularly arranged c-fold replication of the well-dispersed threshold matrix $D^n$ dives the rotated matrix $R^{c*n}$ which include irregularly arranged sub-matrices. Each element of the rotated matrix $R^{c*n}$ is related to an element of the original non-rotated well-dispersed threshold matrix $D^{c*n}$ by a one-to-one relationship.

The $(c*n)^2$ terms of the rotated matrix $R^{c*n}$ can be found inside the square redundant matrix $S^{n*(a+b)}$ of size $n*(a+b)$ by $n*(a+b)$. The matrix $S^{n*(a+b)}$ can be extended to the whole Cartesian plane by applying formulae (5) and (6).

ILLUSTRATED EMBODIMENTS

In order to illustrate the method used to produce the rotated matrix $R^{c*n}$ from a c-fold replication of the well-dispersed matrix $D^n$ by a one-to-one discrete rotation, let us take a look at the example shown in FIG. 7. In this example, $\{a,b,c\} = \{3,4,5\}$, $n=4$, $\alpha = \arctan(4/3)$, $dx_1 = 3*n = 12$, $dy_1 = 4*n = 16$, $dx_2 = -4*n = -16$, $dy_2 = 3*n = 12$.

The rotated matrix $R^{20}$ is obtained from a 5-fold replicated well-dispersed matrix $D^4$. The well-dispersed matrix $D^4$ is duplicated five times vertically and horizontally, as shown in FIG. 7a. The resulting 5-fold replicated matrix is known as $D^{20}[i,j]$; indices (i,j) can be considered to be the "coordinates" in the threshold matrix space (in the $\mathbb{Z}$ space where the threshold values are stored). The "rotated coordinates" (x,y) are the indices of the squares of the rotated matrix $R^{20}$ which results from the rotation. They can be calculated using the following formulae:

$$x = \text{round}\left(\frac{3*(i-i_0) - 4*(j-j_0)}{5}\right) + x_0 \quad (7)$$

$$y = \text{round}\left(\frac{4*(i-i_0) + 3*(j-j_0)}{5}\right) + y_0$$

where $i_0$, $j_0$, respectively $x_0$, $y_0$ define the positions of the matrices $D^n$ respectively $R^{5n}$ in the coordinate systems (i,j) respectively (x,y).

The rotated matrix $R^{20}$ resulting from the rotation of the well-dispersed threshold matrix is calculated using the following formula:

$$R^{20}[x-x_0, y-y_0] = D^{20}[(i-i_0)\bmod 20, (j-j_0)\bmod 20] = D^4[(i-i_0)\bmod 4, (j-j_0)\bmod 4] \quad (8)$$

where "rotated coordinates" x and y are calculated, for any given i and j, according to (7).

The 400 terms of the rotated matrix $R^{20}$ are shown on FIG. 7b inside the square $28 \times 28$ redundant matrix $S^{28}$. The empty (redundant) squares in FIG. 7b can be filled in by applying formulae (7) and (8). The matrix $S^{28}$ can be extended to the whole Cartesian plane by applying formulae (7) and (8).

FURTHER EMBODIMENTS

One can find other rotated matrices $R^{5n}$ by applying the above method as well as formulae (5) and (6), to other matrices $D^{5n}$, where for instance n is a member of the set $2^i$ where i is a positive integer. The matrices obtained in this manner display the same characteristics as the matrix $R^{20}$ and must be considered as further embodiments of the method protected by the present disclosure.

Matrices similar to those obtained using formulae (5) and (6) can be obtained using another methods, either by manipulating the original c-fold replicated well-dispersed threshold matrix $D^{c*n}$ or the rotated matrix $R^{c*n}$ (shifting, rotating, adding or subtracting a given factor, multiplying by a given factor, vertical or horizontal mirror reflection, transposition as well as various combinations of said transformations) or by slightly modifying the method described above. The results obtained by such methods are considered as further embodiments of the method protected by the present disclosure.

Figure 1:
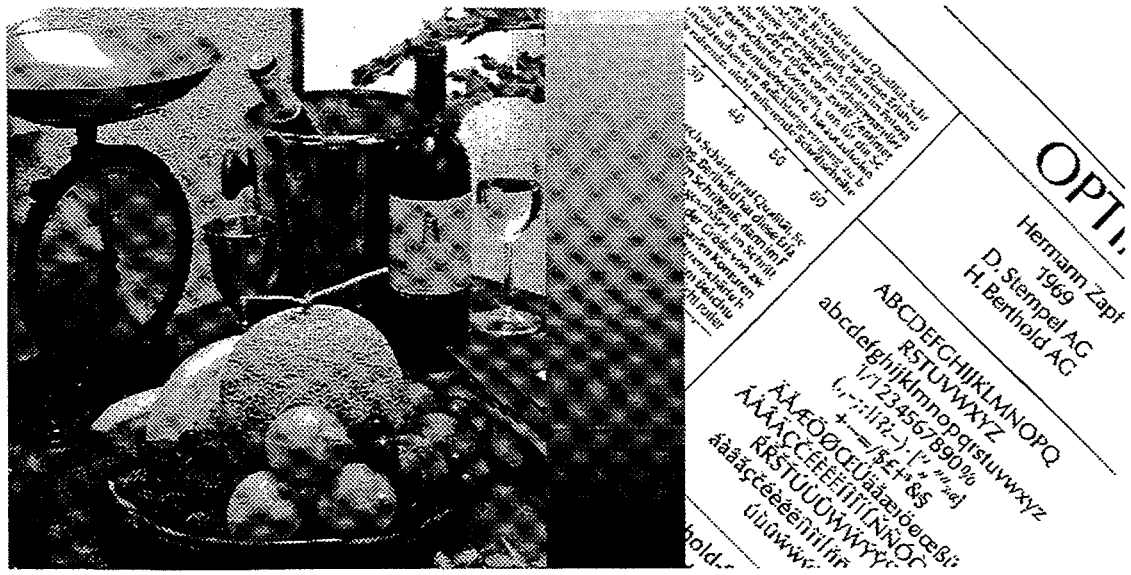
FIGS. 1 and 2 depict the result of a conventional halftoning process using clustered-dot ordered dithering (FIG. 1) and dispersed-dot ordered dithering (FIG. 2).
Figure 2:
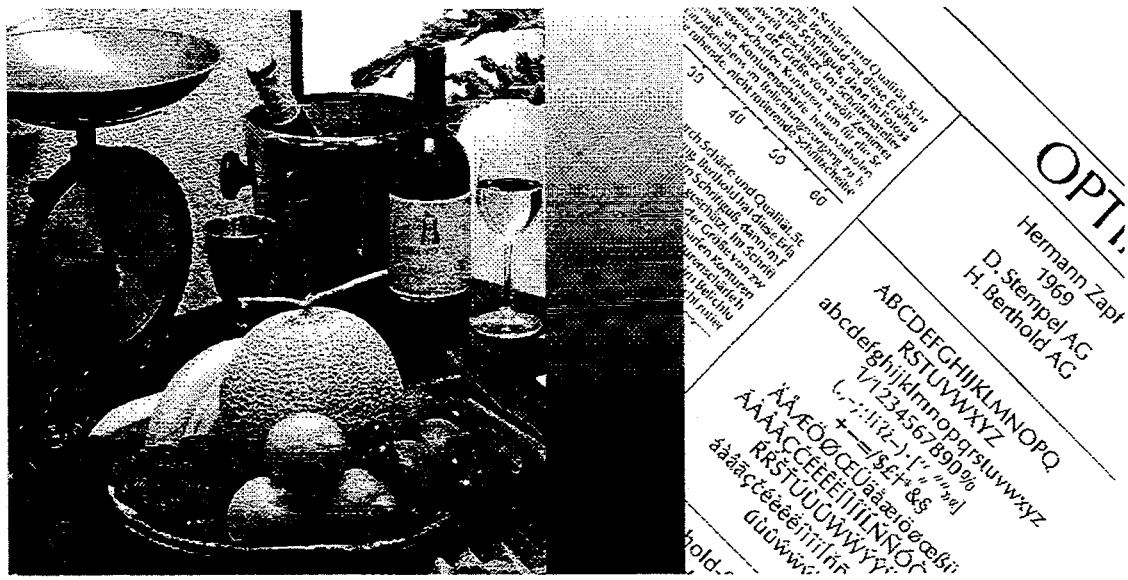
Figure 3:
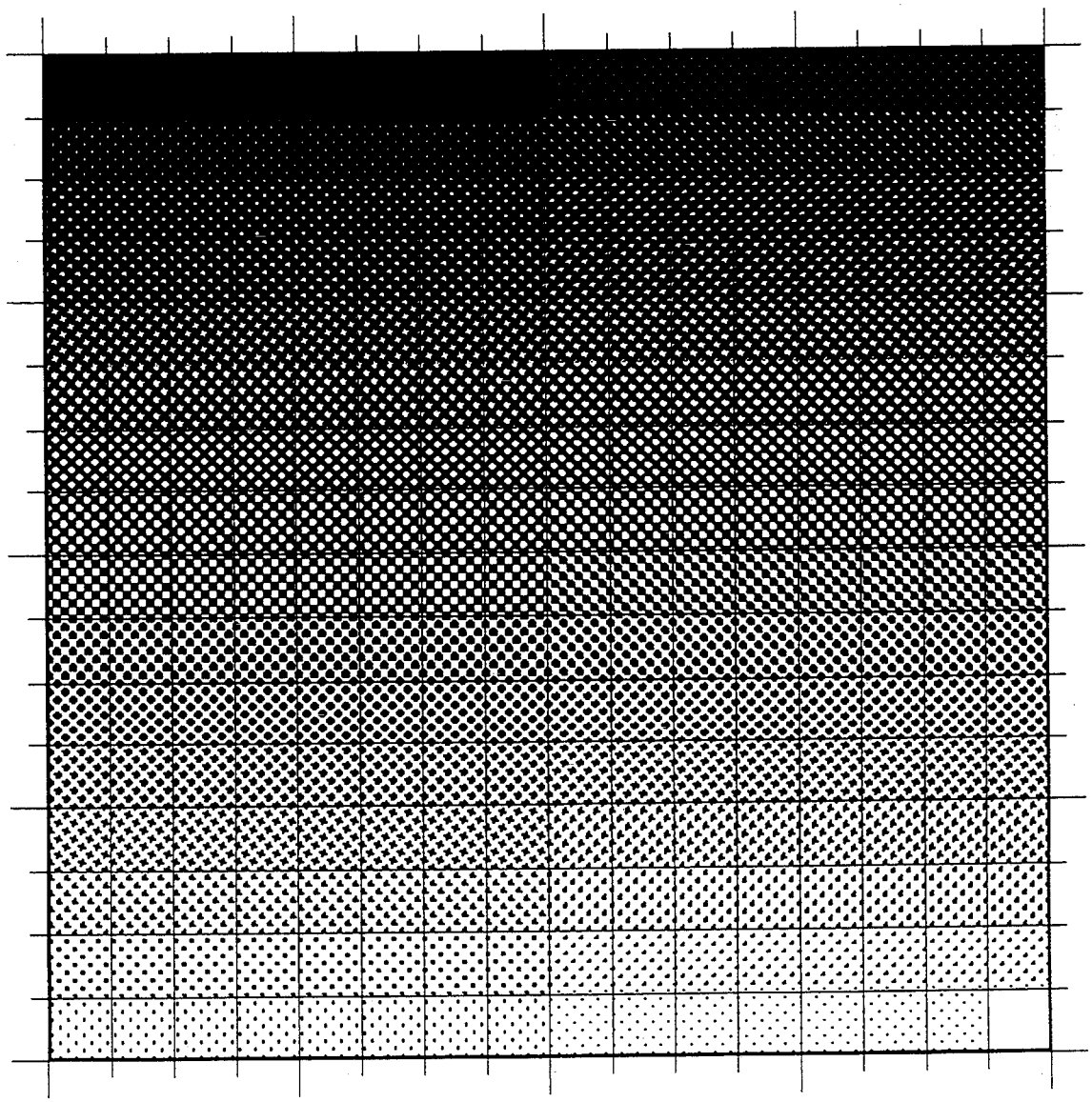
FIG. 3 shows 33 different patterns corresponding to the 33 distinct intensity levels produced with conventional clustered-dot ordered dithering, when the elementary screen element area equals 32 pixels. This image was produced at a 75 dpi resolution, and is therefore magnified fourfold compared to what the result would have been at 300 dpi, and eightfold compared to what it would have been at 600 dpi.
Figure 4:
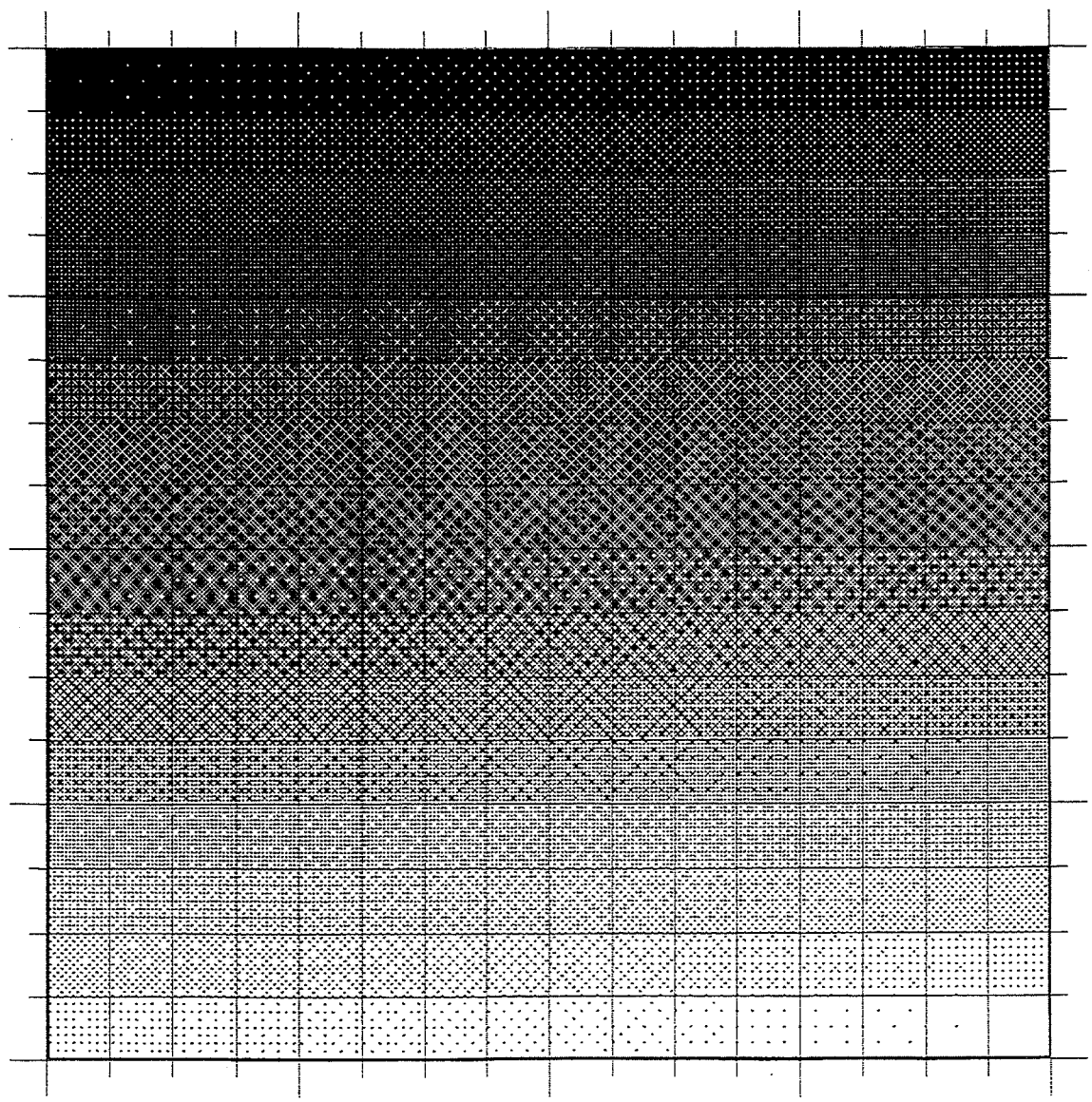
FIG. 4 shows 256 different patterns corresponding to the 256 distinct intensity levels which are reproduced using conventional dispersed-dot ordered dithering of size 16×16. This image was produced at a 75 dpi resolution, and is therefore magnified fourfold compared to what the result would have been at 300 dpi, and eightfold compared to what it would have been at 600 dpi.
Figure 5:
FIG. 5 depicts the result of the disclosed halftoning process.
Figure 6:
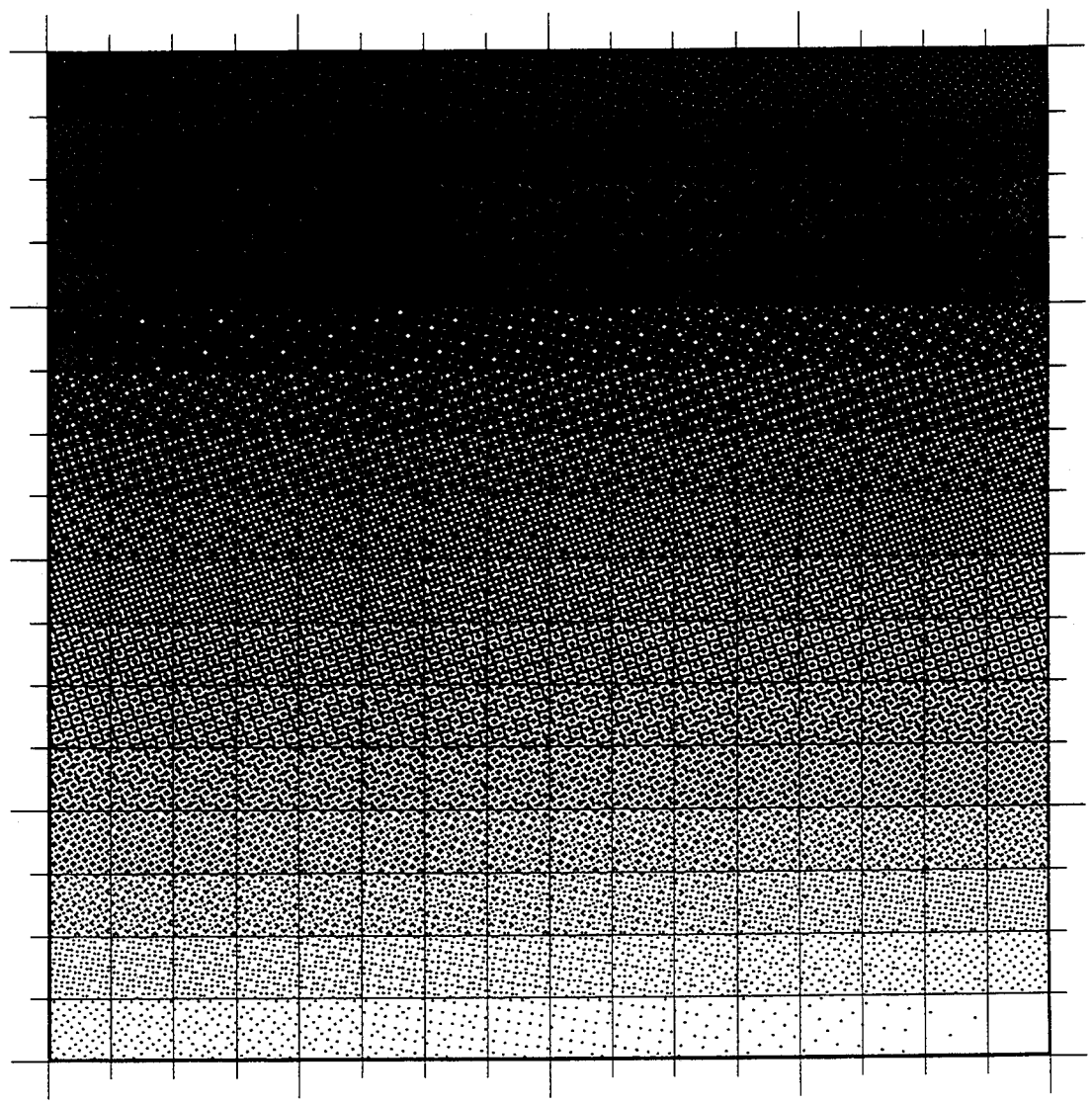
FIG. 6 shows 256 different patterns corresponding to the 256 distinct intensity levels which are reproduced using disclosed matrix $R^{80}$. This image was produced at a 75 dpi resolution, and is therefore magnified fourfold compared to what the result would have been at 300 dpi, and eightfold compared to what it would have been at 600 dpi.

In the case where n=16, one can obtain 257 distinct intensity levels. Nevertheless, since input images are usually coded on eight bits, therefore providing 256 possible levels, only 256 of the 257 distinct intensity levels are effectively used. An example of 256 uniform facets of 256 different intensity levels is shown in FIG. 6. In order to produce this figure, the rotated matrix $R^{80}$ (or the square redundant matrix $S^{112}$) is calculated by applying formulae (5) and (6). In this example, $\{a,b,c\}=\{3,4,5\}$, $n=16$, $\alpha=\arctan(4/3)$, $dx_1=3*n=48$, $dy_1=4*n=64$, $dx_2=-4*n=-64$, $dy_2=3*n=48$.

The disclosed method also applies to further one-to-one discrete rotations of c-fold replications of the well-dispersed threshold matrix $D^n$. The following table gives the beginning of the suite of Pythagorean angles $\alpha=\arctan(b/a)$ or $\beta=\arctan(a/b)$, where $\{a,b,c\}$ are Pythagorean triplets satisfying Diophantine equation $a^2+b^2=c^2$ (the meaning of the $dx_1$, $dy_1$, $dx_2$ and $dy_2$ variables is the same as in the example shown in FIG. 7), where n is a member of the set $2^i$ and where i is a positive integer. The terms of the rotated matrix $R^{c*n}$ are calculated using formulae (5) and (6), once coefficients dx1, dy1, dx2 and dy2 have been set.

| c | a | b | $dx_1$ | $dy_1$ | $dx_2$ | $dy_2$ | $\alpha$ |
|---|---|---|---|---|---|---|---|
| 5 | 3 | 4 | 3n | 4n | −4n | 3n | arctan(4/3) |
| 13 | 5 | 12 | 5n | 12n | −12n | 5n | arctan(12/5) |
| 25 | 7 | 24 | 7n | 24n | −24n | 7n | arctan(24/7) |
| 41 | 9 | 40 | 9n | 40n | −40n | 9n | arctan(40/9) |
| 61 | 11 | 60 | 11n | 60n | −60n | 11n | arctan(60/11) |
| 85 | 13 | 84 | 13n | 84n | −84n | 13n | arctan(84/13) |
| 113 | 15 | 112 | 15n | 112n | −112n | 15n | Arctan(112/15) |
| 145 | 17 | 144 | 17n | 144n | −144n | 17n | arctan(144/17) |
| 181 | 19 | 180 | 19n | 180n | −180n | 19n | arctan(180/19) |
| $\sqrt{a^2+b^2}$ | a | b | a*n | b*n | −b*n | b*n | arctan(b/$\alpha$) |

Figure 8:
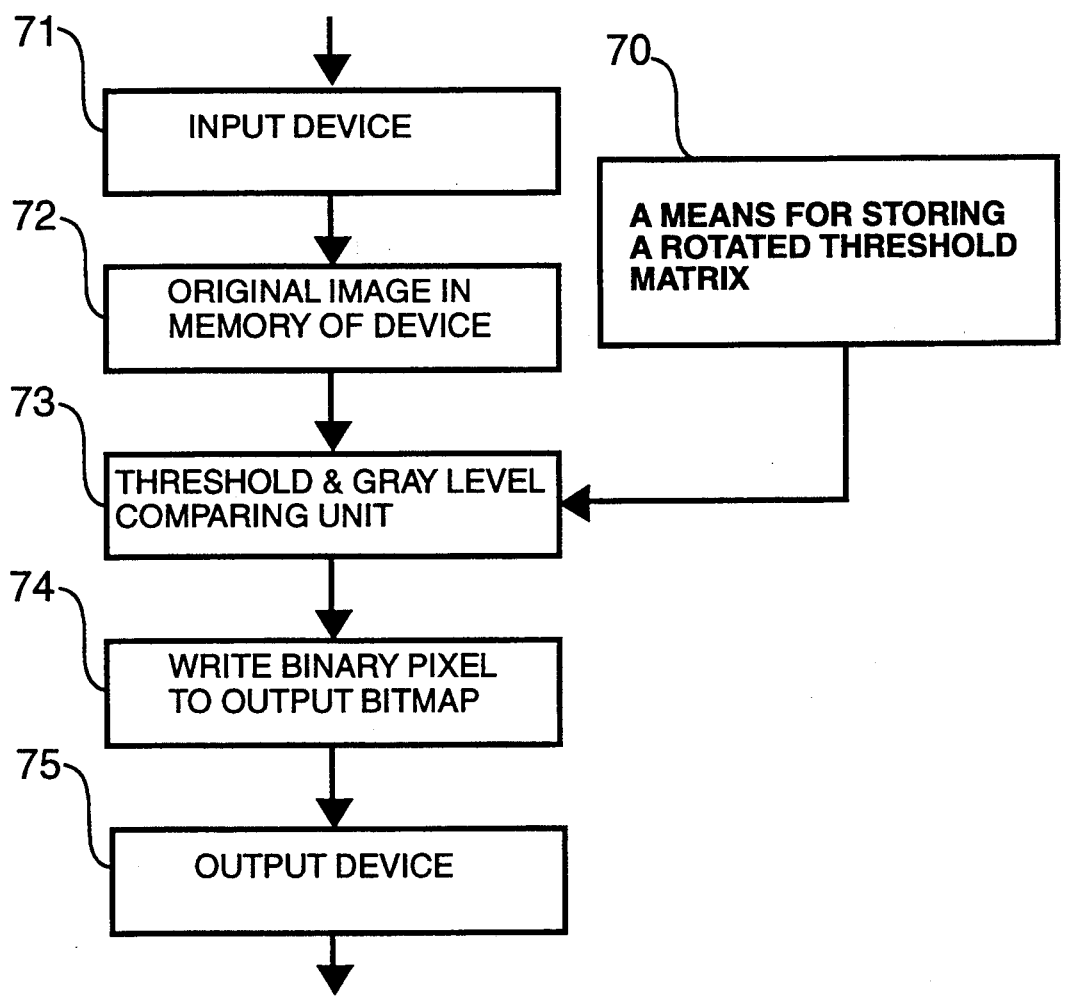
FIG. 8 shows the schematic configuration of an apparatus according to an embodiment of the present disclosure.

The disclosed method can easily be applied when generating color or black/white images for multiple intensity level (multi-level) output devices. Let us suppose that the p-level output device is able to reproduce p different intensity levels in the range [0 ... p−1]. Between any intermediate intensity levels i and i+1 within the range [0 ... p−1], one can apply the disclosed method using a square threshold matrix of size n*n, where n is a member of the set $2^i$ and where i is a positive integer. The number of distinct intensity levels produced with the standard ordered dither method between intensity levels i and i+1, is $n^2+1$. The total number of available intensity levels in the whole range of intensity levels [0 ... p−1], when the disclosed method is applied between all intermediate levels, is $n^2*(p-1)+1$ An apparatus according to an embodiment of the present disclosure, as shown in FIG. 8, comprises a means (70) for applying on a c-fold replication of a well-dispersed threshold matrix $D^n$ a one-to-one discrete rotation. The input grayscale image is read by means of an input device (71) and stored in the memory of the apparatus (72). The comparing unit (73) decides which color is attributed to each pixel of the output image: it can be black or white in case of a bilevel black and white output device, or an intermediate color in case of a multi-level color output device. Unit (74) of the apparatus has the task of writing the produced binary or multilevel image into the resulting output bitmap or pixmap which is sent to the output device (75).

What we claim is:

1. A method for producing digital halftone screens, the screens being composed of a plurality of repetitive screen patterns, all having a predetermined screen angle; said screen patterns being obtained by applying threshold comparisons between input image intensity levels and threshold values contained in a rotated threshold dither matrix; said rotated threshold dither matrix being obtained by applying a discrete one-to-one rotation to a well-dispersed non-rotated square threshold dither matrix composed of multiple well-dispersed non-rotated square threshold sub-matrices; said rotated threshold dither matrix being composed of a multiple of rotated sub-matrices of different shapes; the method being characterized by the fact that all said rotated sub-matrices contain exactly the same number of elementary cells as said non-rotated sub-matrices, that their elementary cell positions are defined by said discrete one-to-one rotation and that the threshold values associated with elementary cells of said non-rotated sub-matrices are identical to corresponding threshold values associated with elementary cells of said rotated sub-matrices, so that said rotated threshold dither matrix can be seen as a spatial reorganization of the non-rotated threshold dither matrix, without modifying the threshold values of said threshold dither matrix; the method comprising the steps of (a) creating and storing in memory said well-dispersed non-rotated square threshold dither matrix by replicating said well-dispersed non-rotated square threshold sub-matrices each of size n by n, c by c times vertically and horizontally, in a threshold matrix coordinate system (i,j), where n and c are integers;

(b) creating and storing in memory said rotated threshold dither matrix in an output coordinate system (x,y); every elementary cell of said rotated threshold dither matrix which contains the threshold value having the coordinates $(x_t,y_t)$ in the output coordinate system (x,y) computed according to the following formula which specifies said discrete one-to-one rotation of angle $\alpha=\arctan(b/a)$:

$$x_t=\text{round}((a*(i_t-i_0)-b*(j_t-j_0))/c)+x_0$$

$$y_t=\text{round}((b*(i_t-i_0)-a*(j_t-j_0))/c)+y_0$$

where $(i_t,j_t)$ define the coordinates of an elementary cell of said non-rotated threshold dither matrix in the threshold matrix coordinate system (i,j) having the same threshold value as the elementary cell $(x_t, y_t)$ of the rotated threshold dither matrix; $(i_0,j_0)$ respectively $(x_0,y_0)$ define the positions of said non-rotated threshold matrix respectively rotated threshold matrix in the coordinate systems (i,j) respectively (x,y) and wherein a, b and c are integers, members of Pythagorean triplets $\{a,b,c\}$ satisfying Diophantine equation $a^2+b^2=c^2$ and said screen angle being $\alpha=\arctan(b/a)$ to said output coordinate system (x,y);

(c) scanning the input gray-scale image pixel by pixel, finding the appropriate rectangular area of each pixel, in said output coordinate system (x,y); then applying, for every elementary dot inside said rectangular area, a comparison between the input gray level and the corresponding threshold value, in the rotated threshold dither matrix defined in step (b), and producing for each elementary dot inside said rectangular area an active (white) pixel respectively inactive (black) pixel, according to the result of said comparison.

2. The method of claim 1, wherein step a) further includes a mathematical modification from the group: shifting, rotating, adding a given factor, subtracting a given factor, multiplying by a given factor, vertical mirror reflection, horizontal mirror reflection, vertical and horizontal (diagonal) mirror reflection, transposition, applied to said well-dispersed non-rotated threshold dither matrix.

3. The method of claim 1, wherein step b) further includes mathematical modifications from the group: shifting, rotating, adding a given factor, subtracting a given factor, multiplying by a given factor, vertical mirror reflection, horizontal mirror reflection, vertical and horizontal (diagonal) mirror reflection, transposition, applied to said well-dispersed non-rotated threshold dither matrix.

* * * * *